(12) United States Patent
Sheik et al.

(10) Patent No.: US 9,071,433 B2
(45) Date of Patent: Jun. 30, 2015

(54) METHOD AND APPARATUS FOR IMPROVING RE-TRANSMISSION OF RECONFIGURATION MESSAGES

(71) Applicant: QUALCOMM Incorporated, San Diego, CA (US)

(72) Inventors: Ansah Ahmed Sheik, Hyderbad (IN); Liangchi Hsu, San Diego, CA (US); Sathish Krishnamoorthy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 14/041,485

(22) Filed: Sep. 30, 2013

(65) Prior Publication Data
US 2014/0274083 A1 Sep. 18, 2014

Related U.S. Application Data

(60) Provisional application No. 61/778,980, filed on Mar. 13, 2013.

(51) Int. Cl.
| | |
|---|---|
| *H04W 72/00* | (2009.01) |
| *H04W 24/00* | (2009.01) |
| *H04W 4/00* | (2009.01) |
| *H04B 7/00* | (2006.01) |

(Continued)

(52) U.S. Cl.
CPC ............. *H04L 1/1858* (2013.01); *H04W 72/04* (2013.01); *H04L 1/188* (2013.01)

(58) Field of Classification Search
USPC .............. 455/418–420, 423–425, 434, 435.2, 455/436–437, 450, 452.2, 456.1–456.2, 455/456.5–456.6, 466, 509, 517, 524–525, 455/550.1, 556.2, 561; 370/328–329, 370/331–332, 338, 341, 346, 349–350, 449, 370/469, 903, 910; 714/2, 3, 48–49, 714/748–749

See application file for complete search history.

(56) References Cited

U.S. PATENT DOCUMENTS

| | | | | |
|---|---|---|---|---|
| 6,826,406 | B1 * | 11/2004 | Vialen et al. | ................... 455/450 |
| 7,801,527 | B2 * | 9/2010 | Putcha | ....................... 455/435.1 |

(Continued)

OTHER PUBLICATIONS

3GPP TS 25.331 V11.5.0 (Mar. 2013), 3rd Generation Partnership Project; Technical Specification Group Radio Access Network; Radio Resource Control (RRC); Protocol specification (Release 11) 2079 pages.

(Continued)

*Primary Examiner* — Meless Zewdu
(74) *Attorney, Agent, or Firm* — Arent Fox LLP

(57) ABSTRACT

The present disclosure presents an improved method and apparatus for re-transmission of reconfiguration messages. For example, the disclosure presents a method for detecting that a reconfiguration complete message is transmitted from a user equipment (UE) to a network and initiating a reconfiguration re-transmission timer upon the detection. In addition, such an example method, may include determining that the UE has not received a layer two acknowledgement (L2 ACK) message for the transmitted reconfiguration complete message from the network prior to expiration of the reconfiguration re-transmission timer and triggering a cell update message to the network in response to the determination that the UE has not received the L2 ACK message. As such, improved re-transmission of reconfiguration messages may be achieved.

24 Claims, 13 Drawing Sheets

(51) Int. Cl.
*H04L 1/18* (2006.01)
*H04W 72/04* (2009.01)

(56) References Cited

U.S. PATENT DOCUMENTS

| | | | | |
|---|---|---|---|---|
| 8,599,874 | B2* | 12/2013 | Pedlar et al. | 370/469 |
| 8,804,812 | B2* | 8/2014 | Seo et al. | 375/240 |
| 2004/0203778 | A1* | 10/2004 | Kuo et al. | 455/436 |
| 2005/0176437 | A1* | 8/2005 | Mir | 455/450 |
| 2008/0198763 | A1* | 8/2008 | Fischer et al. | 370/254 |
| 2009/0175175 | A1* | 7/2009 | Somasundaram et al. | 370/242 |
| 2012/0026903 | A1* | 2/2012 | Song et al. | 370/252 |
| 2012/0257601 | A1 | 10/2012 | Kim et al. | |
| 2013/0053052 | A1* | 2/2013 | Ke et al. | 455/452.1 |
| 2013/0114748 | A1 | 5/2013 | Kubota et al. | |
| 2013/0122918 | A1* | 5/2013 | Boley et al. | 455/450 |
| 2013/0182681 | A1 | 7/2013 | Sane et al. | |
| 2013/0194994 | A1 | 8/2013 | Dayal et al. | |
| 2013/0287002 | A1* | 10/2013 | Kim et al. | 370/331 |
| 2014/0016559 | A1* | 1/2014 | Jang et al. | 370/328 |

OTHER PUBLICATIONS

International Search Report and Written Opinion—PCT/US2013/068103—ISA/EPO—Feb. 6, 2014 10 pages.

* cited by examiner

METHOD AND APPARATUS FOR IMPROVING RE-TRANSMISSION OF RECONFIGURATION MESSAGES

CLAIM OF PRIORITY UNDER 35 U.S.C. §119

The present application for patent claims priority to U.S. Provisional Patent Application No. 61/778,980, filed Mar. 13, 2013, entitled "Method and Apparatus for Delivery of Reconfiguration Message," which is assigned to the assignee hereof, and hereby expressly incorporated by reference herein.

BACKGROUND

1. Field

Aspects of the present disclosure relate generally to wireless communication systems, and more particularly, to re-transmission of reconfiguration messages.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance wireless technologies not only to meet the growing demand for mobile broadband access, but to advance and enhance the user experience with mobile communications. Recently, consumer and network operator demand for better and more reliable network performance has resulted in the need for improved over the air (OTA) reconfiguration signaling.

In 3GPP and other cellular systems, a network sends signaling messages to a user equipment (UE) to maintain radio resource control (RRC) connection and configure/re-configure radio resources. The UE sends a layer 2 acknowledgement (L2 ACK) to the network followed by a reconfiguration complete message upon completion of the reconfiguration at the UE, and waits for a L2 ACK from the network.

However, the UE may not receive a L2 ACK from the network or the network may fail to send the L2 ACK to the UE. The reason for this may include bad radio frequency (RF) conditions or enhanced dedicated channel (E-DCH) allocation not sufficient enough for the successful delivery of L2 ACK messages from the network. As a result, the UE may lose synchronization with the network and may drop the call.

Additionally, the UE may not be able to make a mobile originated (MO) call because of not receiving L2 ACK for initial direct transfer for a long time and the recovery from such scenarios may even take longer. In such scenarios, radio link layer (RLC) of the UE can trigger a RLC RESET to synchronize with the network.

Furthermore, the time the UE waits for a L2 ACK before initiating a RLC RESET or retransmission of reconfiguration complete message depends on UE RLC configuration parameters, for example, Timer_Poll and Max_Dat, configured by the network. If the current approaches are used, the UE may wait a long time to recover from scenarios described above and may result in call drops or UE call origination failures.

Therefore, there is a desire for improved re-transmission of reconfiguration messages.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for improving re-transmission of reconfiguration messages. For example, the present disclosure presents an example method for detecting that a reconfiguration complete message is transmitted from a user equipment (UE) to a network and initiating a reconfiguration re-transmission timer upon the detection. In addition, such method may include determining that the UE has not received a layer two acknowledgement (L2 ACK) message for the transmitted reconfiguration complete message from the network prior to expiration of the reconfiguration re-transmission timer and triggering a cell update message to the network in response to the determination that the UE has not received the L2 ACK message.

In an additional aspect, an apparatus for improving re-transmission of reconfiguration messages is disclosed. The apparatus may include means for detecting that a reconfiguration complete message is transmitted from a user equipment (UE) to a network, means for initiating a reconfiguration re-transmission timer upon the detection, means for determining that the UE has not received a layer two acknowledgement (L2 ACK) message for the transmitted reconfiguration complete message from the network prior to expiration of the reconfiguration re-transmission timer and means for triggering a cell update message to the network in response to the determination that the UE has not received the L2 ACK message.

In a further aspect, an apparatus for improving re-transmission of reconfiguration messages is described. The apparatus may include a reconfiguration message detecting component to detect that a reconfiguration complete message is transmitted from a user equipment (UE) to a network, a reconfiguration re-transmission timer initiating component to initiate a reconfiguration re-transmission timer upon the detection, a layer two acknowledgement (L2 ACK) determining component to determine that the UE has not received a layer two acknowledgement (L2 ACK) message for the transmitted reconfiguration complete message from the network prior to expiration of the reconfiguration re-transmission timer and a cell update triggering component to trigger a cell update message to the network in response to the determination that the UE has not received the L2 ACK message.

Moreover, the present disclosure presents a computer program product for improving re-transmission of reconfiguration messages. The computer program product may include a computer-readable medium comprising code executable by a computer for detecting that a reconfiguration complete message is transmitted from a user equipment (UE) to a network, initiating a reconfiguration re-transmission timer upon the detection, determining that the UE has not received a layer two acknowledgement (L2 ACK) message for the transmitted reconfiguration complete message from the network prior to expiration of the reconfiguration re-transmission timer and triggering a cell update message to the network in response to the determination that the UE has not received the L2 ACK message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides a method and apparatus for improving re-transmission of reconfiguration messages. In particular, the described method and apparatus may be utilized for detecting that a reconfiguration complete message is transmitted from a user equipment (UE) to a network, initiating a reconfiguration re-transmission timer upon the detection, determining that the UE has not received a layer two acknowledgement (L2 ACK) message for the transmitted reconfiguration complete message from the network prior to expiration of the reconfiguration re-transmission time, and triggering a cell update message to the network in response to the determination that the UE has not received the L2 ACK message.

Figure 1:
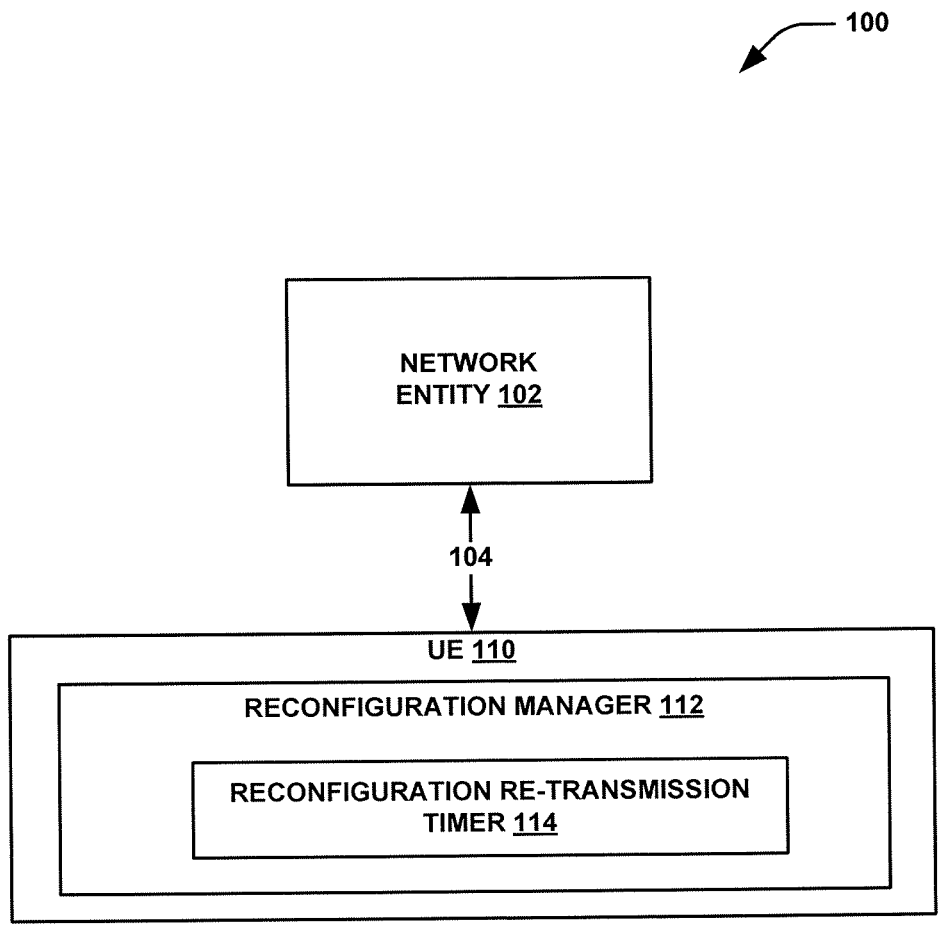
FIG. 1 is a block diagram illustrating an example wireless system in aspects of the present disclosure.

Referring to FIG. 1, a wireless communication system 100 is illustrated that facilitates improved re-transmission of reconfiguration messages between a user equipment (UE) and a network entity. For example, system 100 may include UE 110 that may communicate with network entity 102 via one or more over-the-air links 104. For example, network entity 102 can be a CDMA, GSM, Ev-DO, W-CDMA, Wi-Max, LTE, or LTE Advanced radio access technology (RAT) network. Additionally, network entity 102 may include one or more of any type of network components, for example, an access point, including a base station (BS) or Node B or eNodeB or a femtocell, a relay, a peer-to-peer device, an authentication, authorization and accounting (AAA) server, a mobile switching center (MSC), etc., that can enable UE 110 communicate and/or establish and maintain link 104 with network entity 102.

In an aspect, for example, UE 110 may be in a connected state (for example, RRC_CONNECTED state) as defined in 3GPP Specifications. For example, the UE 110 may be in a continuous reception state and may seek communication with network entity 102.

In an aspect, UE 110 may include a reconfiguration manager 112, which may be configured for improving re-transmission of reconfiguration messages. In an additional aspect, reconfiguration manager 112 may further be configured to detect at a UE that the UE sent reconfiguration complete signaling message to a network and initiate a reconfiguration re-transmission timer 114. The UE waits for a L2 ACK from the network until the expiration of the reconfiguration re-transmission timer. If the UE fails to receive a L2 ACK from the network prior to the expiration of the reconfiguration re-transmission timer 114, the UE triggers a cell update message to the network. Upon receiving a cell update message from the UE, the network may respond to the UE as per 3GPP Specifications.

In an example aspect, reconfiguration signaling manager 112 located in UE 110 may be configured to determine that the UE has sent a reconfiguration complete signaling message to the network or network entity 102. Further, reconfiguration signaling manager 112 may be configured to simultaneously initiate reconfiguration re-transmission timer 114. Additionally, the UE may be configured to wait for a layer two acknowledgement (L2 ACK) for the reconfiguration complete message sent from the UE, and trigger a cell update message to the network upon expiration of the reconfiguration timer if a L2 ACK is not received at the UE. In an aspect, the reconfiguration re-transmission timer is set to a value based at least on radio link control (RLC) configuration parameters, for example, Timer_Poll, Max_Dat, activation time of a reconfiguration message, round trip time (RFT) of radio link layer (RLC) layer, etc. as described in detail below.

In an additional aspect, UE 110 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entity 102 of system 100 may include one or more of any type of network components, for example, an access point, including a base station (BS) or a Node B, an eNode B, femtocell, a pico cell, a relay, a peer-to-peer device, an authentication, authorization and accounting (AAA) server, a mobile switching center (MSC), a radio network controller (RNC), etc.

Figure 2:
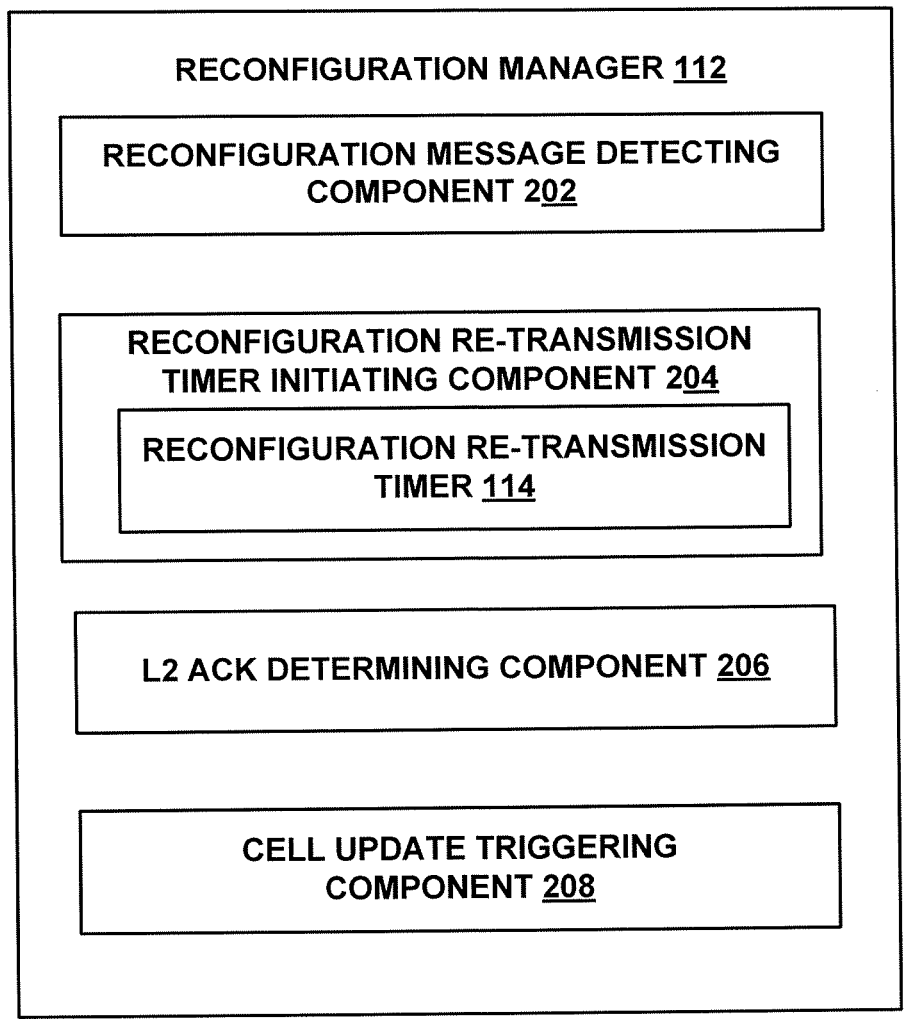
FIG. 2 is block diagram illustrating an example reconfiguration manager in aspects of the present disclosure.

FIG. 2 illustrates, for example, a reconfiguration manager 112 which can be configured to improve re-transmission of reconfiguration messages. In an aspect, reconfiguration manager 112 may include, for example, a reconfiguration message detecting component 202, reconfiguration re-transmission timer initiating component 204, reconfiguration re-transmission timer 114, a L2 ACK determining component 206 and cell update triggering component 208.

In an aspect, reconfiguration message detecting component 202 may be configured to detect that UE 110 has sent a reconfiguration complete message to network entity 102. In an example aspect, the UE sends a reconfiguration complete message in response to receiving a reconfiguration message from the network. For example, the network may send a reconfiguration message to the UE for reconfiguration of, for example, radio bearer, transport channel etc. The reconfiguration message from the network and the reconfiguration complete message from the UE may be, for example, radio resource control (RRC) messages. Additionally, the UE may send a layer 2 acknowledgment (L2 ACK) to the network to confirm that the UE received the reconfiguration message from the network. The L2 ACK can be a, for example, a radio link control (RLC) message.

In an additional aspect, the UE has to send the reconfiguration complete message prior to the expiration of RRC N2 Timer as defined in 3GPP Specification.

In an aspect, reconfiguration re-transmission timer initiating component 204 may be configured to start a timer, for example, a reconfiguration re-transmission timer 114, upon detecting that the UE has sent a reconfiguration complete message to the network. In an example aspect, the value of reconfiguration re-transmission timer can be configured based on RLC configuration parameters, for example, Timer_Poll, Max_Dat, etc. The reconfiguration re-transmission timer is implementation dependent and can be configured to a value to optimize network performance.

In an aspect, the re-transmission timer is initiated after expiration of a RRC N2 timer. In an example aspect, the reconfiguration re-transmission timer is configured to be initiated after the expiration of "activation time of a reconfiguration message" parameter. An activation time of a reconfiguration message parameter indicates when a reconfigured value takes effect and is received in the reconfiguration message from the network. The activation time is defined in 3GPP Specification 25.331 and allows for synchronization of the UE and the network.

In another example aspect, the reconfiguration re-transmission timer 114 can be configured based on a round trip time (RTT) of the RLC layer, and may be set to a value proportional to the RTT.

In another example aspect, the reconfiguration re-transmission timer 114 can be set to a value less than the value of Timer_Poll*Max_Dat to reduce the delay associated with re-transmission of the reconfiguration complete message.

In another example aspect, properties like, for example, quality of service (QoS), etc. can be used for configuration of the reconfiguration re-transmission timer. Additionally, for emergency calls or delay sensitive applications, the reconfiguration re-transmission timer may be configured to a value lower than that for applications that are not delay sensitive.

In an aspect, L2 ACK determining component 206 may be configured to determine that the UE has not received a layer two acknowledgement (L2 ACK) message for the transmitted reconfiguration complete message from the network prior to expiration of the reconfiguration re-transmission timer. In an example aspect, UE 110 sends a reconfiguration complete message and waits for a L2 ACK from the network. If the UE fails to receive a L2 ACK prior to the expiration of the reconfiguration re-transmission timer, the L2 ACK determining component determines that the L2 ACK is not received by the UE. Additionally, the L2 ACK determining component may notify cell update triggering component 208 of the failure to receive the L2 ACK from the network.

In an aspect, cell update triggering component 208 may be configured to trigger a cell update message to the network in response to the determination that the UE has not received the L2 ACK message. In an example aspect, the cell update triggering component 209 sends a cell update message to the network and the network responds with an appropriate action/message as defined in the 3GPP Specification. Based on the action/message from the network, the above described mechanism allows the UE to sync up with the network in a timely manner and may result in fewer call drops and lower delays associated with UE originated calls.

Figure 3:
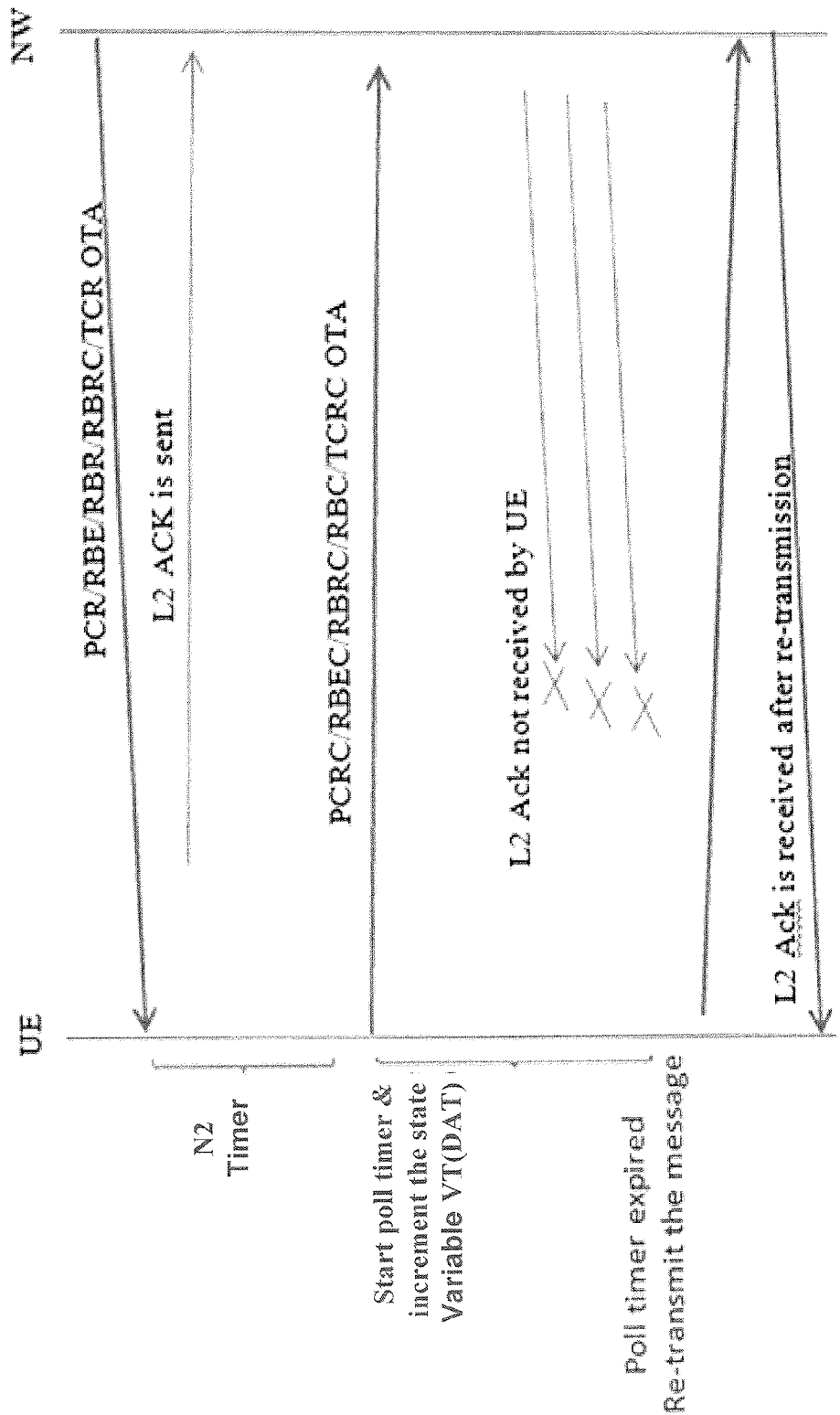
FIG. 3 is an example call flow illustrating re-transmission of a reconfiguration complete message.

Referring to FIG. 3, illustrated is an example call flow for re-transmission of a reconfiguration complete message. For example, a network (NW) 102 may send a reconfiguration message to the UE, for example, UE 110. Once the UE receives the reconfiguration message, the UE sends a layer two acknowledge (L2 ACK) message to the NW and simultaneously starts a radio resource control (RRC) N2 Timer as defined in 3GPP TS 25.331 Specification, for example, section 13.5. However, the UE has to send a reconfiguration complete message to the NW prior to the expiration of the RRC N2 Timer.

The RRC N2 Timer varies for different RRC procedures or messages. For example, the reconfiguration message may include any reconfiguration message as defined in the 3GPP Specification, for example, a physical channel reconfiguration (PRC) message, a transport channel reconfiguration (TCR) message, a radio bearer reconfiguration (RBC) message, etc. as shown in FIG. 3. Once the UE sends the reconfiguration complete message to the NW, the UE starts a Timer_Poll and increments a RLC configuration parameter, Max_Dat as defined in the 3GPP Specification. The Timer_Poll parameter describes how frequently the UE can poll whether a packet data unit (PDU) that includes part of the reconfiguration complete message was delivered to the NW. Max_Dat parameter describes the maximum amount of times the PDU can be re-transmitted by the UE before aborting transmission. In an example aspect, Timer_Poll may be configured for 100 ms and Max_Dat may be configured for a value of 10.

When the UE waits for a L2 ACK from the NW, the UE waits until Max_Dat is reached and the Timer_Poll expires. After the expiration of the timer, the UE re-transmits the reconfiguration complete message to the network. However, this delay prior to the re-transmission of the reconfiguration complete message is too long and the UE may lose synchronization with the NW and may result in a dropped call affecting the performance of the UE and/or the NW.

Figure 4:
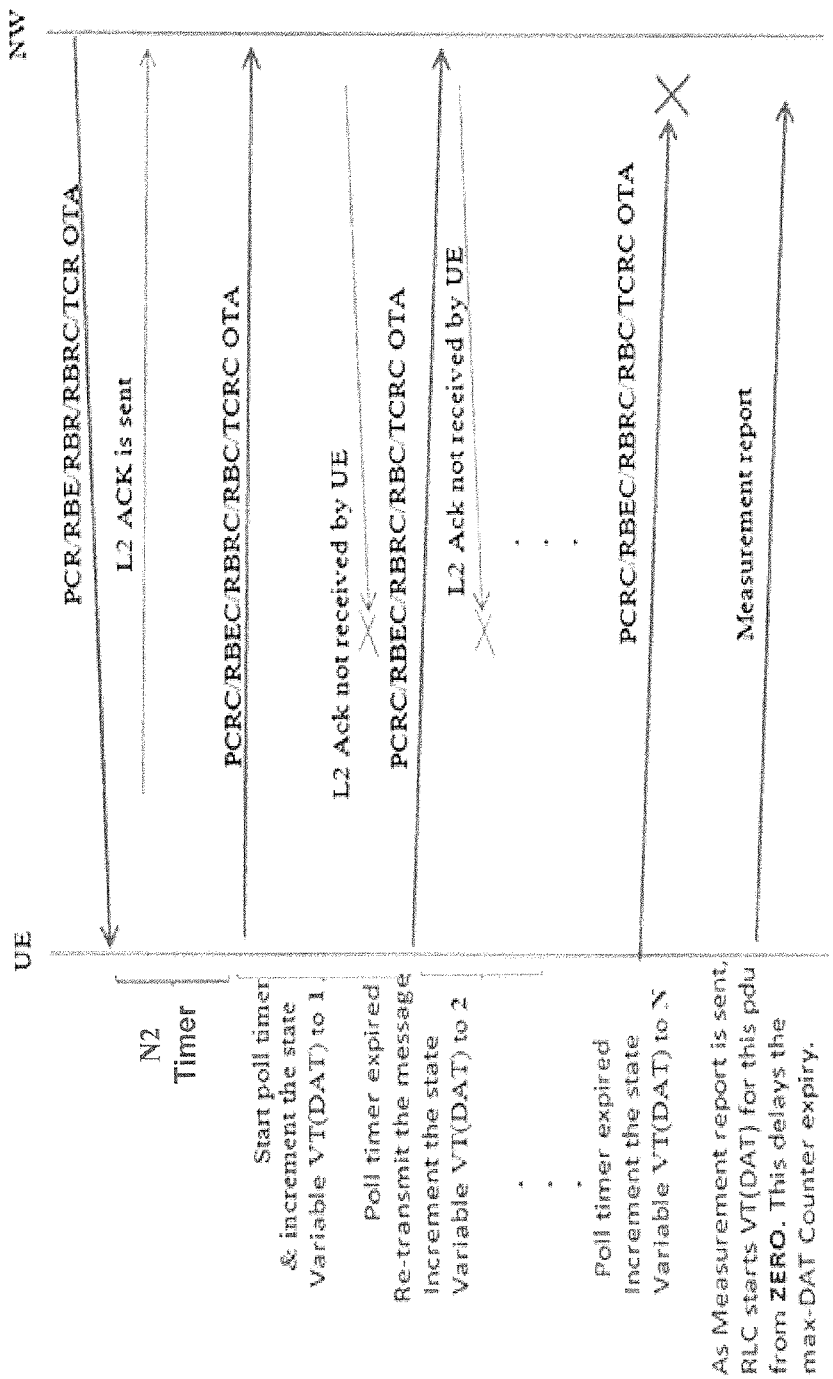
FIG. 4 is an additional example call flow illustrating re-transmission of a reconfiguration complete message.

Referring to FIG. 4, illustrated is an additional example call flow of re-transmission of reconfiguration complete message. In addition to the steps described above in reference to FIG. 3, FIG. 4 includes transmittal of measurement reports (MRs) from the UE to the NW. The MRs may be transmitted from the UE based on a request from the network. However, in some scenarios, the transmission of the MRs may interfere with the delivery of reconfiguration messages by resetting Max_Dat parameter every time a MR is sent by the UE. This may result in even longer delays in re-transmission of the reconfiguration complete message by the UE to the network as shown in FIG. 4 increasing the risk of losing synchronization between the UE and the NW and resulting in a dropped call affecting the performance of the UE and/or the NW.

Figure 5:
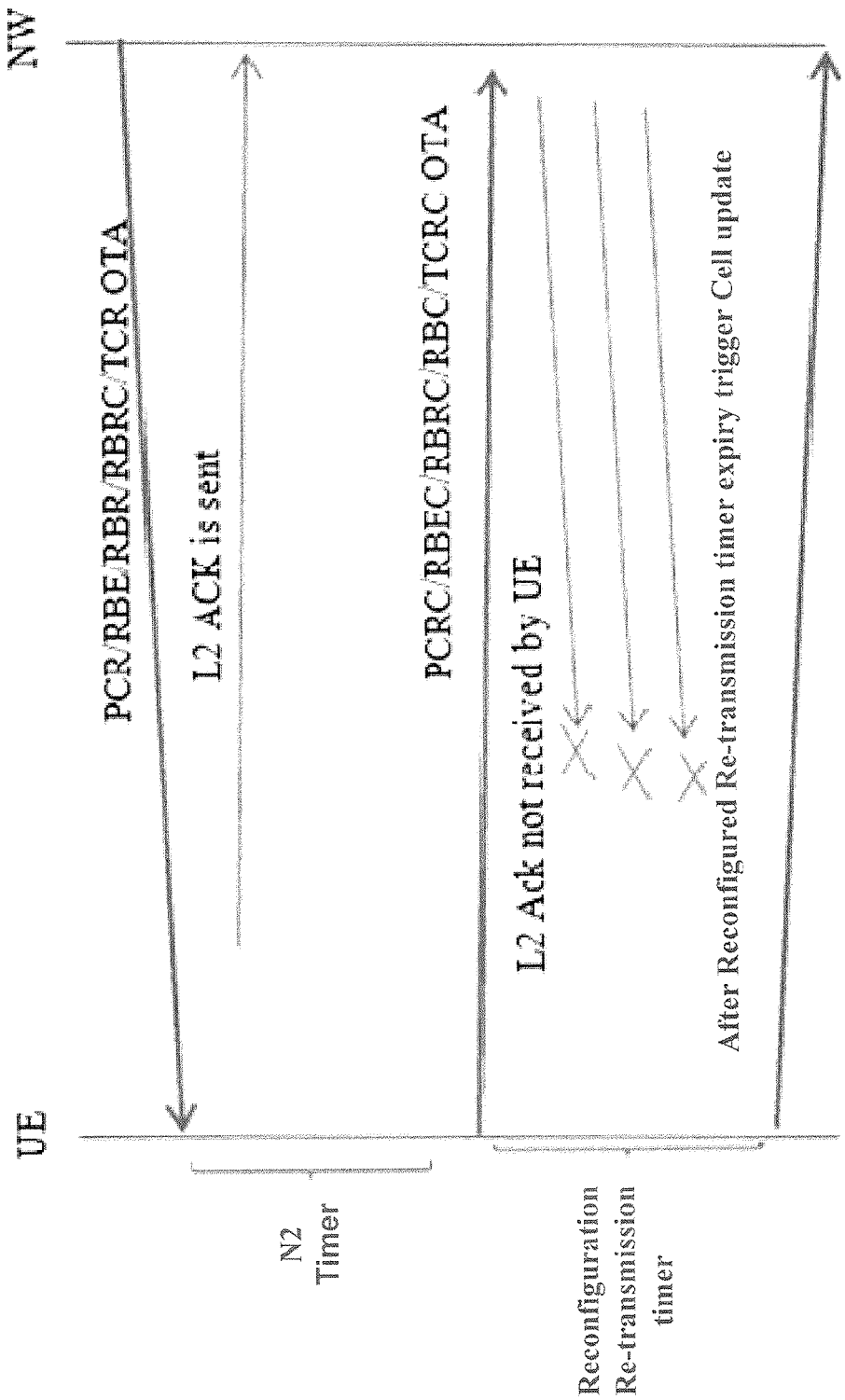
FIG. 5 is an example call flow illustrating re-transmission of a reconfiguration complete message in aspects of the present disclosure.

Referring to FIG. 5, illustrated is an example call flow for improved re-transmission of reconfiguration complete message in an aspect of the present disclosure. In addition to the steps described above in reference to FIG. 3 and/or FIG. 4, a new timer, reconfiguration re-transmission timer 114 is initiated by UE 110 when the UE transmits a reconfiguration complete message to the NW. In an example aspect, the reconfiguration re-transmission timer may be configured based on the values of Timer_Poll, Max_Dat, RTT of RLC layer, application type, etc. As shown in FIG. 5, if a L2 ACK message for the reconfiguration complete message sent to the NW is not received by the UE prior to expiration of the reconfiguration re-transmission timer, the UE triggers a cell update message to the NW as shown above.

In an additional aspect, the value of the reconfiguration re-transmission timer 114 is set to a value typically lower than the value of Timer_Poll*Max_Dat to minimize losing connectivity between the UE and the NW and/or improve performance of the UE and/or NW.

Figure 6:
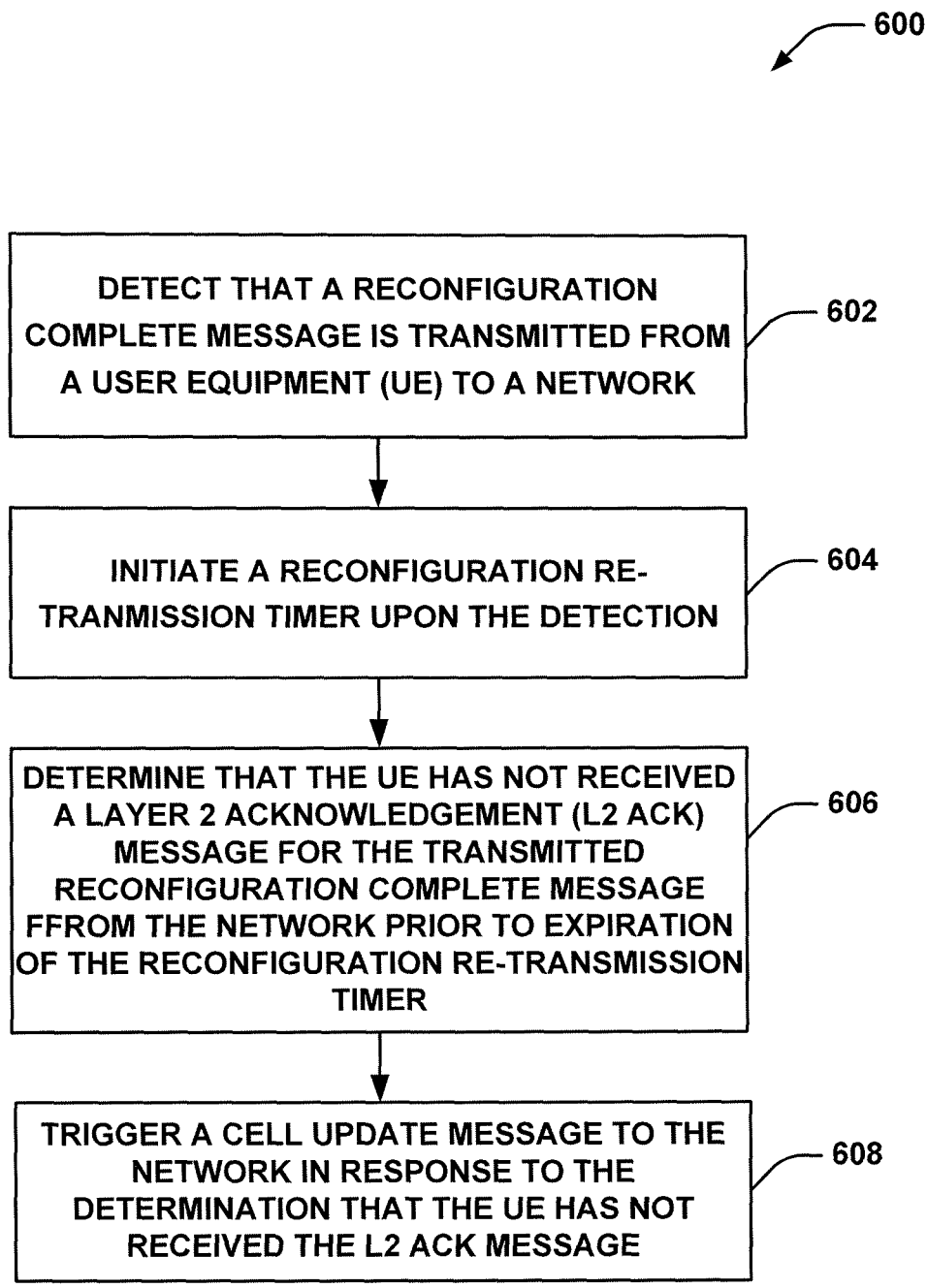
FIG. 6 is a flow diagram illustrating aspects of a method for re-transmission of reconfiguration messages.

FIG. 6 illustrates an example methodology 600 for improving re-transmission of reconfiguration messages. In an aspect, at block 602, methodology 600 may include detecting that a reconfiguration complete message is transmitted from a user equipment (UE) to a network. For example, in an aspect, UE 110, reconfiguration manager 112, and/or reconfiguration message detecting component 202 may detect that a reconfiguration complete message is transmitted from UE 110 to network entity 102.

Further, at block 604, methodology 600 may include initiating a reconfiguration re-transmission timer upon the detection. For example, in an aspect, UE 110, reconfiguration manager 112, and/or reconfiguration re-transmission timer initiating component 204 may initiate a reconfiguration re-transmission timer 114 upon detecting that UE 110 has sent a reconfiguration complete message to network entity 102. In an additional aspect, the reconfiguration complete message is transmitted from the UE to the network in response to receiving a reconfiguration message from the network.

Furthermore, at block 606, methodology 600 may include determining that the UE has not received a layer two acknowledgement (L2 ACK) message for the transmitted reconfiguration complete message from the network prior to expiration of the reconfiguration re-transmission timer. For example, in an aspect, UE 110, reconfiguration manager 112, and/or L2 ACK determining component 206 may determine that UE 110 failed to receive a L2 ACK from the network prior to expiration of the reconfiguration re-transmission timer 114.

Additionally, at block 608, methodology 600 may include triggering a cell update message to the network in response to the determination that the UE has not received the L2 ACKC message. For example, in an aspect, UE 110, reconfiguration manager 112, and/or cell update triggering component 208 may trigger a cell update message to the network entity 102 to synchronize UE 110 with the network entity.

In an additional or optional aspect, a RRC N2 timer initiating component may be configured to initiate a RRC N2 time upon receiving the reconfiguration message from the network.

Figure 7:
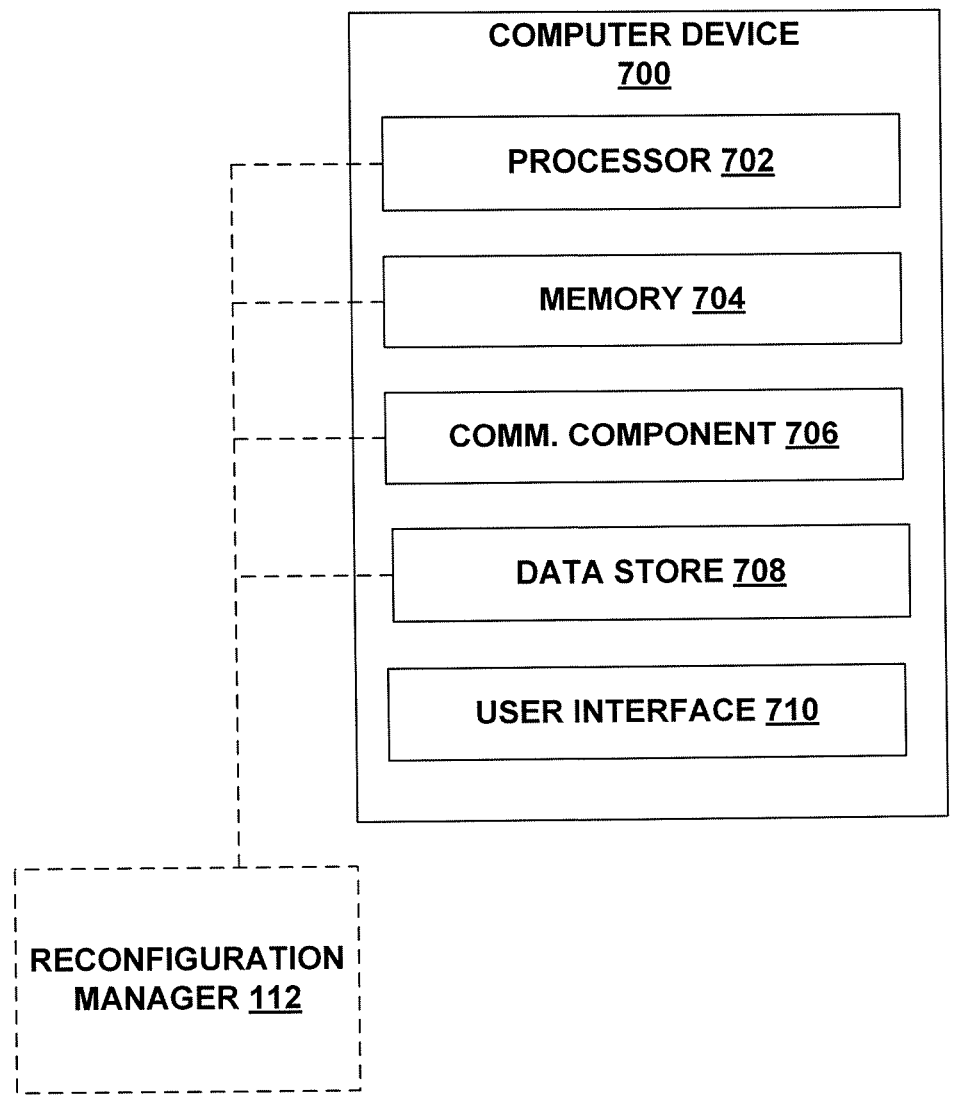
FIG. 7 is a block diagram illustrating aspects of a computer device according to the present disclosure.

Referring to FIG. 7, in an aspect, UE 110, for example, including reconfiguration manager 112, or the one or more network entities, for example, network entity 102, of FIG. 1 may be represented by a specially programmed or configured computer device 700. For example, the special programming or configuring of computer device 700 may be programming or configuring to perform that respective functions described herein for the respective entity, such as for UE 110 and network entity 102.

Computer device 700 includes a processor 702 specially configured to carry out processing functions associated with one or more of components and functions described herein. Processor 702 can include a single or multiple set of processors or multi-core processors. Moreover, processor 702 can be implemented as an integrated processing system and/or a distributed processing system.

Computer device 700 further includes a memory 704, such as for storing data used herein and/or local versions of applications and/or instructions or code being executed by processor 702, such as to perform the respective functions of the respective entities described herein. Memory 704 can include any type of memory usable by a computer, such as random access memory (RAM), read only memory (ROM), tapes, magnetic discs, optical discs, volatile memory, non-volatile memory, and any combination thereof.

Further, computer device 700 includes a communications component 706 that provides for establishing and maintaining communications with one or more parties utilizing hardware, software, and services as described herein. Communications component 706 may carry communications between components on computer device 700, as well as between computer device 700 and external devices, such as devices located across a communications network and/or devices serially or locally connected to computer device 700. For example, communications component 706 may include one or more buses, and may further include transmit chain components and receive chain components associated with a transmitter and receiver, respectively, or a transceiver, operable for interfacing with external devices.

Additionally, computer device 700 may further include a data store 708, which can be any suitable combination of hardware and/or software, that provides for mass storage of information, databases, and programs employed in connection with aspects described herein. For example, data store 708 may be a data repository for applications not currently being executed by processor 702.

Computer device 700 may additionally include a user interface component 710 operable to receive inputs from a user of computer device 700, and further operable to generate outputs for presentation to the user. User interface component 710 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Figure 8:
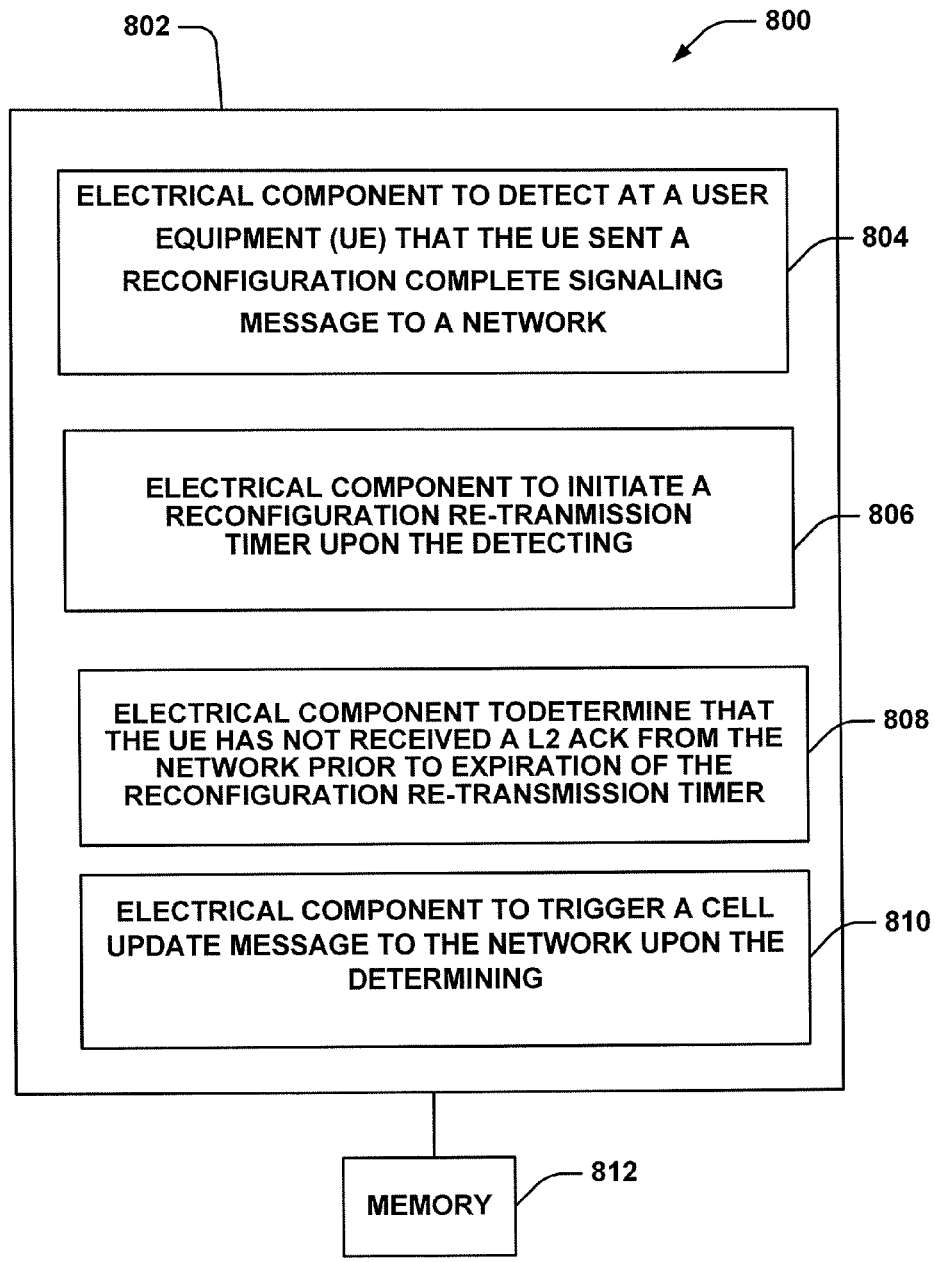
FIG. 8 is a block diagram illustrating aspects of a logical grouping of electrical components as contemplated by the present disclosure.

Referring to FIG. 8, an example system 800 is displayed for re-transmission of reconfiguration messages. For example, system 800 can reside at least partially within UE 110 (FIG. 1). It is to be appreciated that system 800 is represented as including functional blocks, which can be functional blocks that represent functions implemented by a processor, software, or combination thereof (for example, firmware). System 800 includes a logical grouping 802 of electrical components that can act in conjunction. For instance, logical grouping 802 can include an electrical component 804 for detecting at a user equipment (UE) that the UE sent a reconfiguration complete message to a network in response to receiving a reconfiguration message from the network. In an aspect, electrical component 804 may comprise reconfiguration detecting component 202 (FIG. 2).

Additionally, logical grouping 802 can include an electrical component 806 for initiating a reconfiguration re-transmission timer upon the detecting. In an aspect, electrical component 806 may comprise reconfiguration re-transmission timer initiating component 204 (FIG. 2). In an additional aspect, logical grouping 806 can include reconfiguration re-transmission timer 114 (FIG. 2).

Additionally, logical grouping 802 can include an electrical component 808 for determining that the UE has not received a layer two acknowledgement (LA ACK) from the network prior to the expiration of the reconfiguration re-transmission timer. In an aspect, electrical component 808 may comprise L2 ACK determining component 206 (FIG. 2).

Furthermore, logical grouping 802 can include an electrical component 810 for triggering a cell update message to the network in response to the determining. In an aspect, electrical component 810 may comprise cell update triggering component 208 (FIG. 2).

Additionally, system 800 can include a memory 812 that retains instructions for executing functions associated with the electrical components 804, 806, 808, and 810, stores data used or obtained by the electrical components 804, 808, 808, and 810, etc. While shown as being external to memory 812, it is to be understood that one or more of the electrical components 804, 806, 808, and 810 can exist within memory 812. In one example, electrical components 804, 808, 808, and 810 can comprise at least one processor, or each electrical component 804, 808, 808, and 810 can be a corresponding module of at least one processor. Moreover, in an additional or alternative example, electrical components 804, 808, 808, and 810 can be a computer program product including a computer readable medium, where each electrical component 804, 808, 808, and 810 can be corresponding code.

Figure 9:
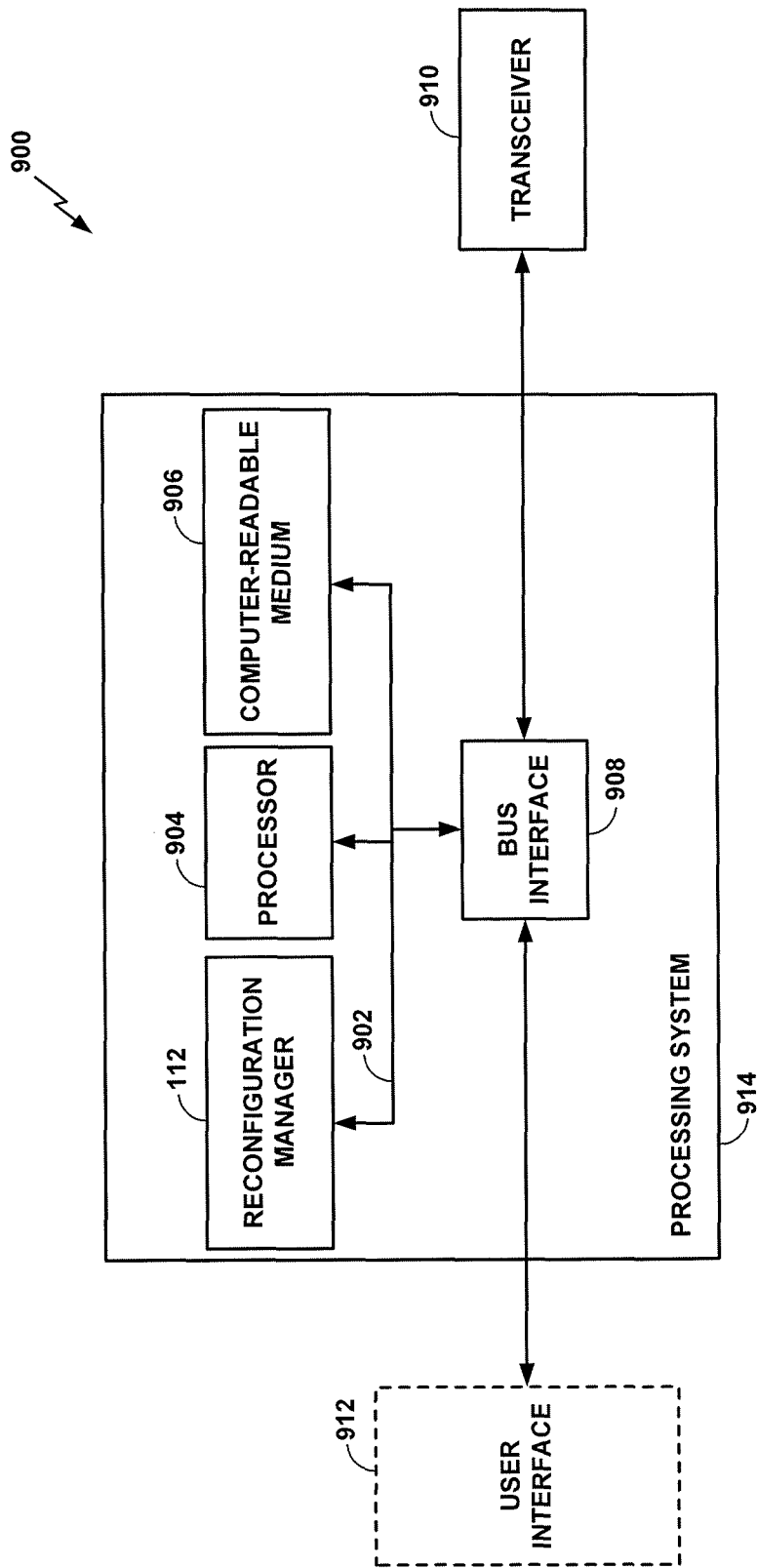
FIG. 9 is a block diagram illustrating an example of a hardware implementation for an apparatus employing a processing system.

FIG. 9 is a block diagram illustrating an example of a hardware implementation for an apparatus 900 employing a processing system 914 for carrying out aspects of the present disclosure, such as methods for cell reselection during mode transitions. In this example, the processing system 914 may be implemented with a bus architecture, represented generally by a bus 902. The bus 902 may include any number of interconnecting buses and bridges depending on the specific application of the processing system 914 and the overall design constraints. The bus 902 links together various circuits including one or more processors, represented generally by the processor 904, computer-readable media, represented generally by the computer-readable medium 906, and one or more components described herein, such as, but not limited to, reconfiguration manager 112 and reconfiguration re-transmission timer 114 (FIGS. 1 and 2). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 909. The software, when executed by the processor 904, causes the processing system 914 to perform the various functions described infra for any particular apparatus. The computer-readable medium 906 may also be used for storing data that is manipulated by the processor 604 when executing software.

Figure 10:
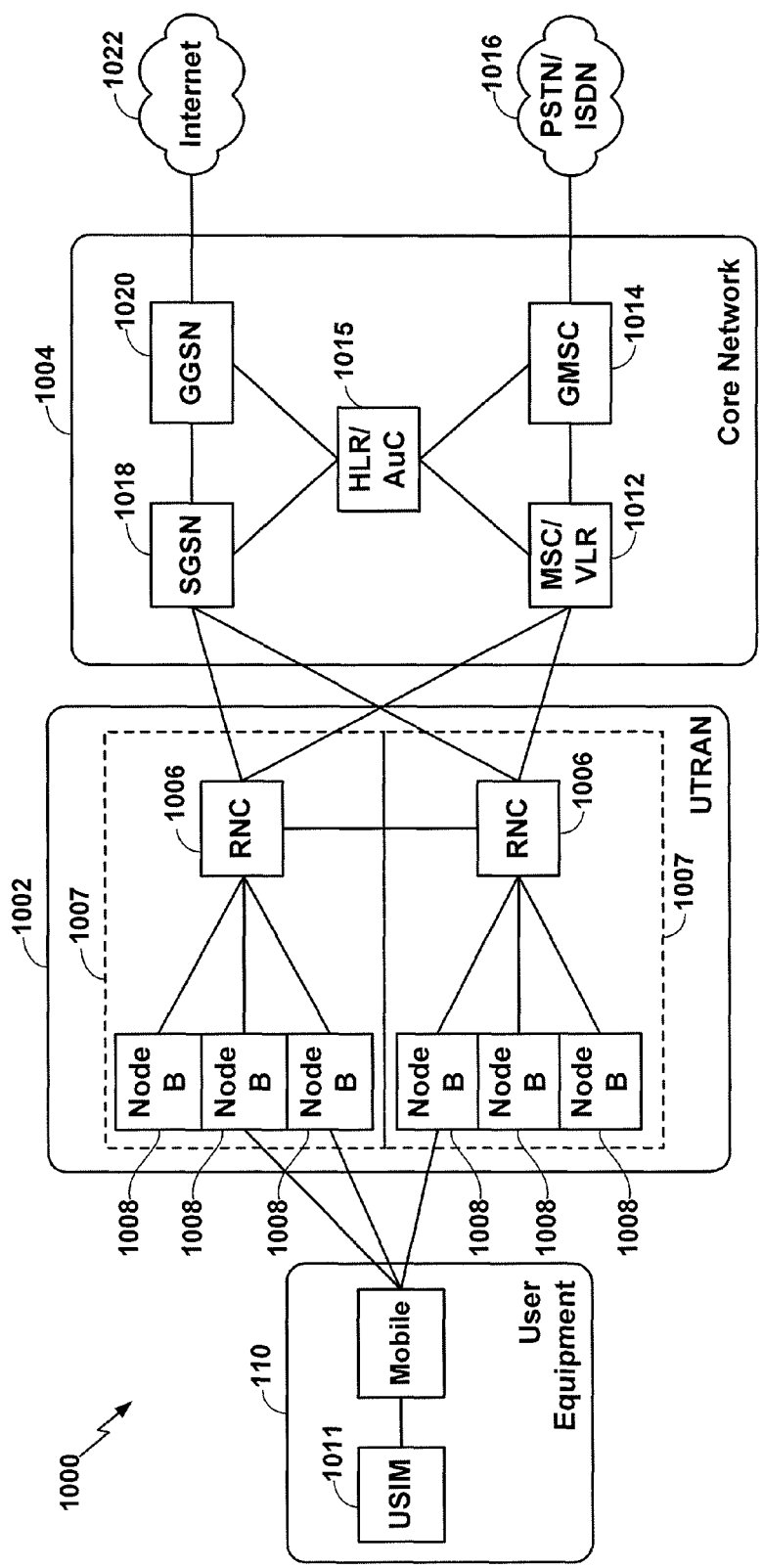
FIG. 10 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 10 are presented with reference to a UMTS system 1000 employing a W-CDMA air interface, and may include a UE 110 executing an aspect of reconfiguration manager 112 of FIG. 1. A UMTS network includes three interacting domains: a Core Network (CN) 1004, a UMTS Terrestrial Radio Access Network (UTRAN) 1002, and UE 110. In an aspect, as noted, UE 1010 may be UE 110 (FIG. 1) and may be configured to perform functions thereof, for example, including improving re-transmission of reconfiguration messages. Further, UTRAN 1002 may comprises first network entity 102 (FIG. 1), which in this case may be respective ones of the Node Bs 10010. In this example, UTRAN 1002 provides various wireless services including telephony, video, data, messaging, broadcasts, and/or other services. The UTRAN 1002 may include a plurality of Radio Network Subsystems (RNSs) such as an RNS 10010, each controlled by a respective Radio Network Controller (RNC) such as an RNC 1006. Here, the UTRAN 1002 may include any number of RNCs 1006 and RNSs 10010 in addition to the RNCs 1006 and RNSs 10010 illustrated herein. The RNC 1006 is an apparatus responsible for, among other things, assigning, reconfiguring, and releasing radio resources within the RNS 10010. The RNC 1006 may be interconnected to other RNCs (not shown) in the UTRAN 1002 through various types of interfaces such as a direct physical connection, a virtual network, or the like, using any suitable transport network.

Communication between UE 1010 and Node B 10010 may be considered as including a physical (PHY) layer and a medium access control (MAC) layer. Further, communication between UE 1010 and RNC 1006 by way of a respective Node B 10010 may be considered as including a radio resource control (RRC) layer. In the instant specification, the PHY layer may be considered layer 1; the MAC layer may be considered layer 10; and the RRC layer may be considered layer 3. Information herein below utilizes terminology introduced in the RRC Protocol Specification, 3GPP TS 105.331 v9.1.0, incorporated herein by reference.

The geographic region covered by the RNS 10010 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 10010 are shown in each RNS 10010; however, the RNSs 10010 may include any number of wireless Node Bs. The Node Bs 10010 provide wireless access points to a CN 1004 for any number of mobile apparatuses, such as UE 110 or 1010, and may be network entity 102 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In a UMTS system, the UE 1010 may further include a universal subscriber identity module (USIM) 1011, which contains a user's subscription information to a network. For illustrative purposes, one UE 1010 is shown in communication with a number of the Node Bs 10010. The DL, also called the forward link, refers to the communication link from a NodeB 10010 to a UE 1010, and the UL, also called the reverse link, refers to the communication link from a UE 1010 to a NodeB 10010.

The CN 1004 interfaces with one or more access networks, such as the UTRAN 1002. As shown, the CN 1004 is a GSM core network. However, as those skilled in the art will recognize, the various concepts presented throughout this disclosure may be implemented in a RAN, or other suitable access network, to provide UEs with access to types of CNs other than GSM networks.

The CN 1004 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1004 supports circuit-switched services with a MSC 1012 and a GMSC 1014. In some applications, the GMSC 1014 may be referred to as a media gateway (MGW). One or more RNCs, such as the RNC 1006, may be connected to the MSC 1012. The MSC 1012 is an apparatus that controls call setup, call routing, and UE mobility functions. The MSC 1012 also includes a VLR that contains subscriber-related information for the duration that a UE is in the coverage area of the MSC 1012. The GMSC 1014 provides a gateway through the MSC 1012 for the UE to access a circuit-switched network 1016. The GMSC 1014 includes a home location register (HLR) 1015 containing subscriber data, such as the data reflecting the details of the services to which a particular user has subscribed. The HLR is also associated with an authentication center (AuC) that contains subscriber-specific authentication data. When a call is received for a particular UE, the GMSC 1014 queries the HLR 1015 to determine the UE's location and forwards the call to the particular MSC serving that location.

The CN 1004 also supports packet-data services with a serving GPRS support node (SGSN) 10110 and a gateway GPRS support node (GGSN) 1020. GPRS, which stands for General Packet Radio Service, is designed to provide packet-data services at speeds higher than those available with standard circuit-switched data services. The GGSN 1020 provides a connection for the UTRAN 1002 to a packet-based network 1022. The packet-based network 1022 may be the Internet, a private data network, or some other suitable packet-based network. The primary function of the GGSN 1020 is to provide the UEs 1010 with packet-based network connectivity. Data packets may be transferred between the GGSN 1020 and the UEs 1010 through the SGSN 10110, which performs primarily the same functions in the packet-based domain as the MSC 1012 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 10010 and a UE 1010. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1010 provides feedback to Node B 10010 over the HS-DPCCH to indicate whether it correctly decoded a packet on the downlink.

HS-DPCCH further includes feedback signaling from the UE 1010 to assist the Node B 10010 in taking the right decision in terms of modulation and coding scheme and precoding weight selection, this feedback signaling including the CQI and PCI.

HSPA Evolved or HSPA+ is an evolution of the HSPA standard that includes MIMO and 64-QAM, enabling increased throughput and higher performance. That is, in an aspect of the disclosure, the Node B 10010 and/or the UE 1010 may have multiple antennas supporting MIMO technology. The use of MIMO technology enables the Node B 10010 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 1010 to increase the data rate or to multiple UEs 1010 to increase the overall system capacity. This is achieved by spatially precoding each data stream and then transmitting each spatially precoded stream through a different transmit antenna on the downlink. The spatially precoded data streams arrive at the UE(s) 1010 with different spatial signatures, which enables each of the UE(s) 1010 to recover the one or more the data streams destined for that UE 1010. On the uplink, each UE 1010 may transmit one or more spatially precoded data streams, which enables Node B 10010 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 11:
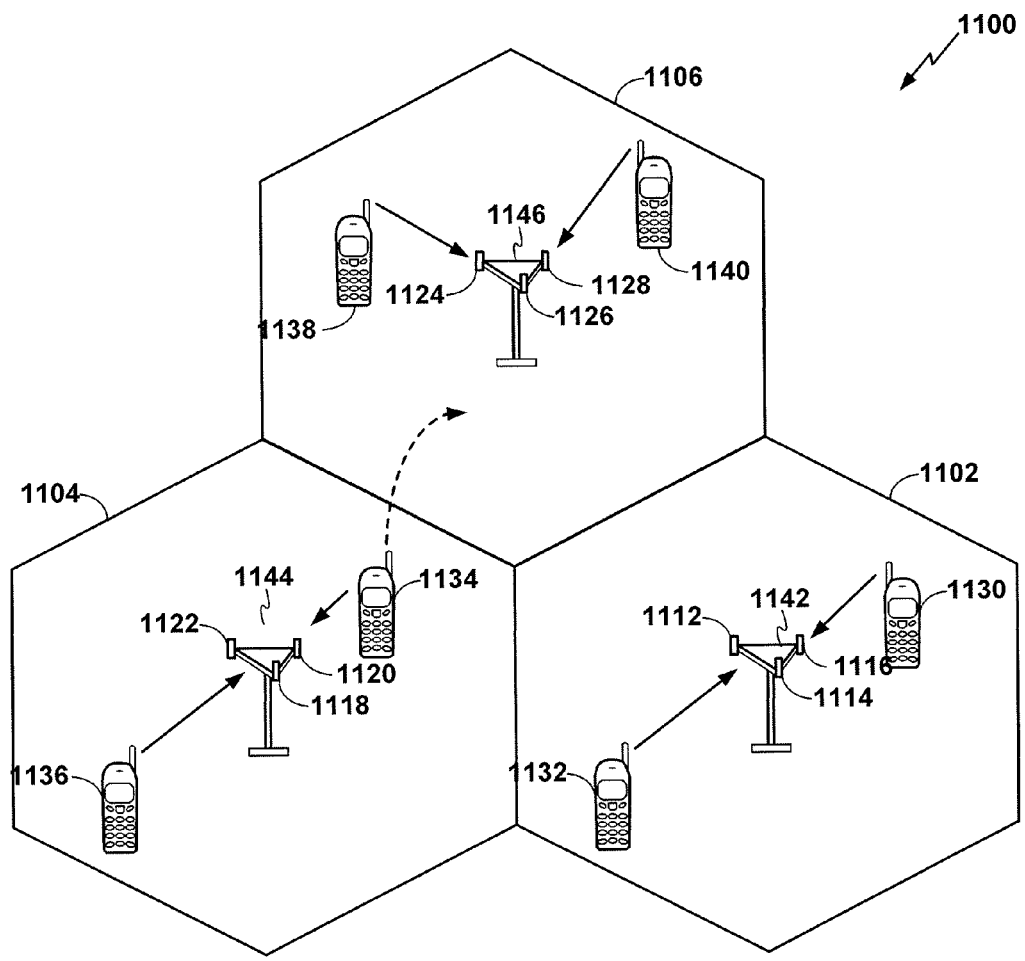
FIG. 11 is a conceptual diagram illustrating an example of an access network.

Referring to FIG. 11, an access network 1100 in a UTRAN architecture is illustrated, and may include one or more UEs configured to include reconfiguration manager 112 (FIG. 1) for improving re-transmission of reconfiguration messages. The multiple access wireless communication system includes multiple cellular regions (cells), including cells 1102, 1104, and 1106, each of which may include one or more sectors. The multiple sectors can be formed by groups of antennas with each antenna responsible for communication with UEs in a portion of the cell. For example, in cell 1102, antenna groups 1112, 1114, and 1116 may each correspond to a different sector. In cell 1104, antenna groups 11111, 1120, and 1122 each correspond to a different sector. In cell 1106, antenna groups 1124, 1126, and 11211 each correspond to a different sector. UEs, for example, 1130, 1132, etc. may include several wireless communication devices, e.g., User Equipment or UEs, including reconfiguration manager 112 of FIG. 1, which may be in communication with one or more sectors of each cell 1102, 1104 or 1106. For example, UEs 1130 and 1132 may be in communication with NodeB 1142, UEs 1134 and 1136 may be in communication with NodeB 1144, and UEs 11311 and 1140 can be in communication with NodeB 1146. Here, each NodeB 1142, 1144, 1146 is configured to provide an access point to a CN 804 (FIG. 8) for all the UEs 1130, 1132, 1134, 1136, 11311, 1140 in the respective cells 1102, 1104, and 1106. Additionally, each NodeB 1142, 1144, 1146 and UEs 1130, 1132, 1134, 1136, 11311, 1140 may be UE 110 of FIG. 1 and may perform the methods outlined herein.

As the UE 1134 moves from the illustrated location in cell 1104 into cell 1106, a serving cell change (SCC) or handover may occur in which communication with the UE 1134 transitions from the cell 1104, which may be referred to as the source cell, to cell 1106, which may be referred to as the target cell. Management of the handover procedure may take place at the UE 1134, at the Node Bs corresponding to the respective cells, at a radio network controller 806 (FIG. 8), or at another suitable node in the wireless network. For example, during a call with the source cell 1104, or at any other time, the UE 1134 may monitor various parameters of the source cell 1104 as well as various parameters of neighboring cells such as cells 1106 and 1102. Further, depending on the quality of these parameters, the UE 1134 may maintain communication with one or more of the neighboring cells. During this time, the UE 1134 may maintain an Active Set, that is, a list of cells that the UE 1134 is simultaneously connected to (i.e., the UTRA cells that are currently assigning a downlink dedicated physical channel DPCH or fractional downlink dedicated physical channel F-DPCH to the UE 1134 may constitute the Active Set). In any case, UE 1134 may execute reconfiguration signaling manager 112 to perform the reselection operations described herein.

Further, the modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 902.11 (Wi-Fi), IEEE 902.16 (WiMAX), IEEE 902.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 12:
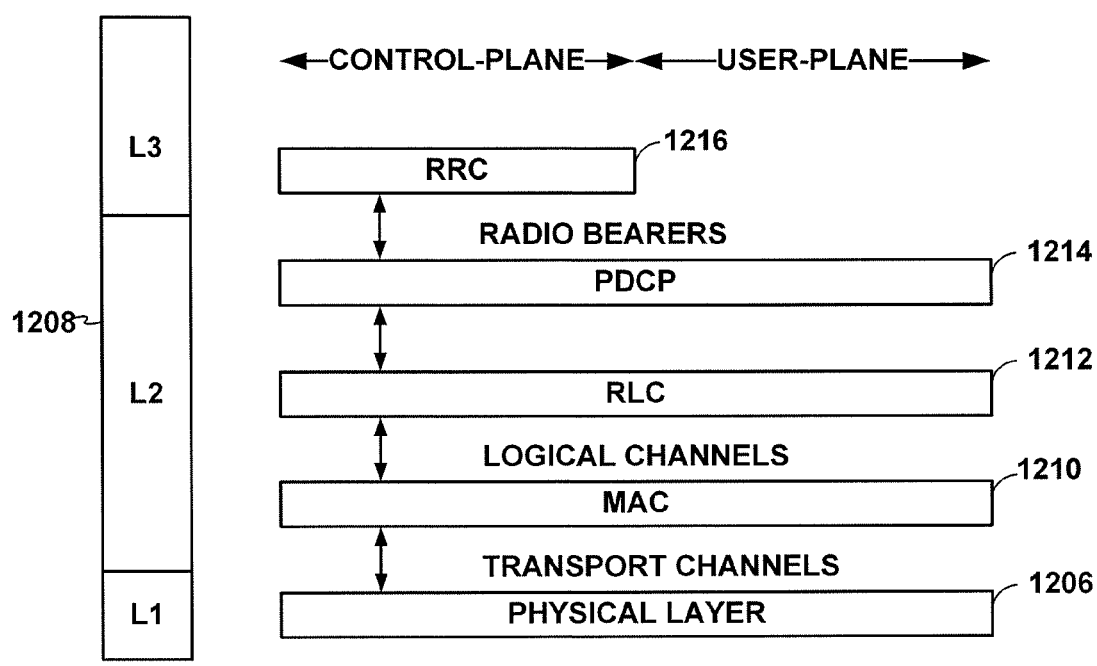
FIG. 12 is a conceptual diagram illustrating an example of a radio protocol architecture for the user and control plane.

The radio protocol architecture may take on various forms depending on the particular application. An example for an HSPA system will now be presented with reference to FIG. 12. FIG. 12 is a conceptual diagram illustrating an example of the radio protocol architecture for the user and control planes.

Turning to FIG. 12, the radio protocol architecture for the UE, for example, UE 112 of FIG. 1 configured to include reconfiguration manager 112 (FIG. 1) for improving re-transmission of reconfiguration message, and a Node B is shown with three layers: Layer 1, Layer 2, and Layer 3. Layer 1 is the lowest lower and implements various physical layer signal processing functions. Layer 1 will be referred to herein as the physical layer 1206. Layer 2 (L2 layer) 1208 is above the physical layer 1206 and is responsible for the link between the UE and node B over the physical layer 1206.

In the user plane, the L2 layer 1208 includes a media access control (MAC) sublayer 1212, a radio link control (RLC) sublayer 1212, and a packet data convergence protocol (PDCP) 1214 sublayer, which are terminated at the node B on the network side. Although not shown, the UE may have several upper layers above the L2 layer 1208 including a network layer (e.g., IP layer) that is terminated at a PDN gateway on the network side, and an application layer that is terminated at the other end of the connection (e.g., far end UE, server, etc.).

The PDCP sublayer 1214 provides multiplexing between different radio bearers and logical channels. The PDCP sublayer 1214 also provides header compression for upper layer data packets to reduce radio transmission overhead, security by ciphering the data packets, and handover support for UEs between NodeBs. The RLC sublayer 1212 provides segmentation and reassembly of upper layer data packets, retransmission of lost data packets, and reordering of data packets to compensate for out-of-order reception due to hybrid automatic repeat request (HARQ). The MAC sublayer 1212 provides multiplexing between logical and transport channels. The MAC sublayer 1212 is also responsible for allocating the various radio resources (e.g., resource blocks) in one cell among the UEs. The MAC sublayer 1212 is also responsible for HARQ operations.

Figure 13:
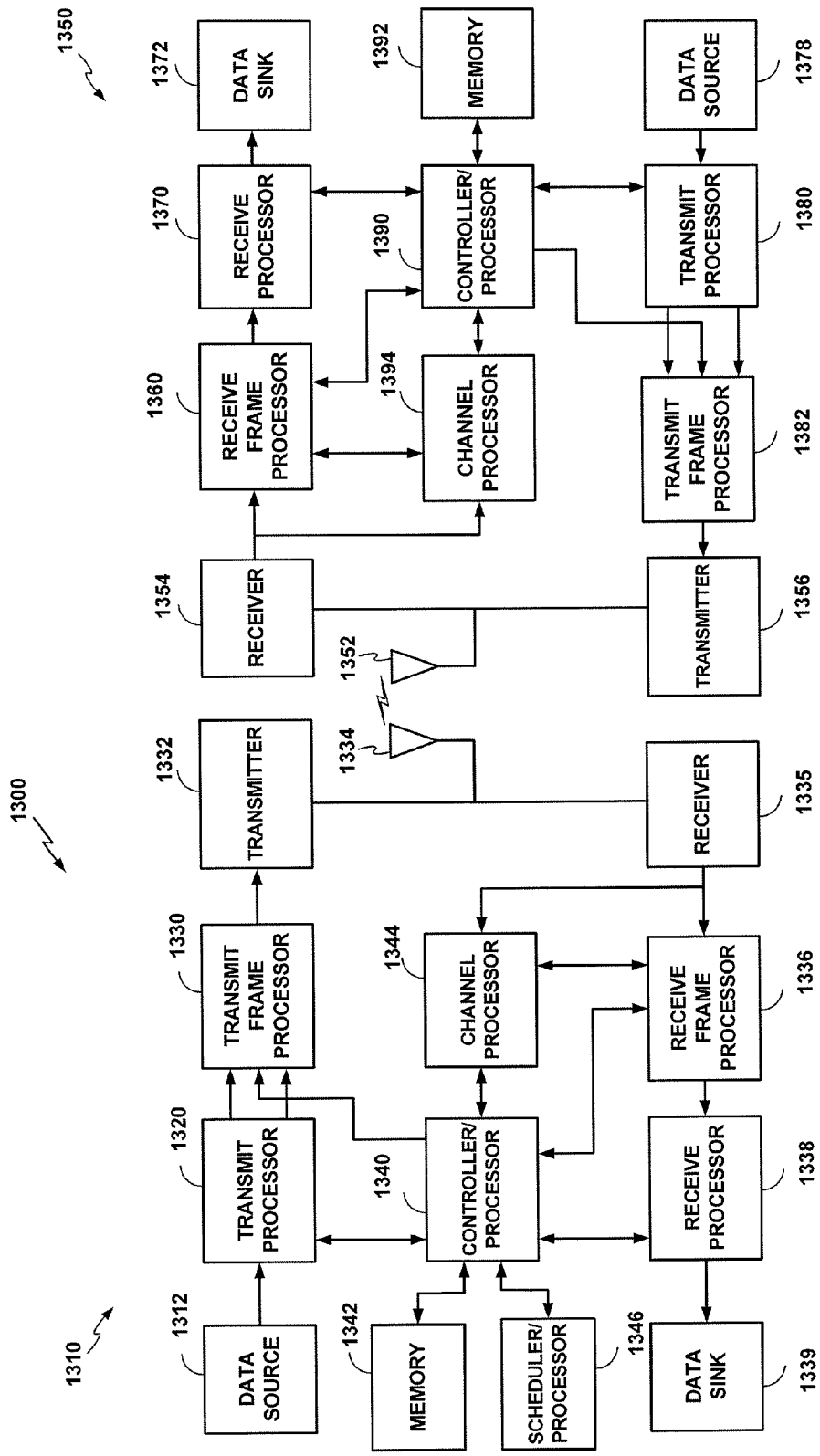
FIG. 13 is a block diagram conceptually illustrating an example of a NodeB in communication with a UE in a telecommunications system.

FIG. 13 is a block diagram of a NodeB 1310 in communication with a UE 1350, where the NodeB 1310 may be network entity 102, and the UE 1350 may be UE 110 of FIG. 1 configured to include reconfiguration manager 112 (FIG. 1) for improving re-transmission of reconfiguration messages. In the downlink communication, a transmit processor 1320 may receive data from a data source 1312 and control signals from a controller/processor 1340. The transmit processor 1320 provides various signal processing functions for the data and control signals, as well as reference signals (e.g., pilot signals). For example, the transmit processor 1320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1344 may be used by a controller/processor 1340 to determine the coding, modulation, spreading, and/or scrambling schemes for the transmit processor 1320. These channel estimates may be derived from a reference signal transmitted by the UE 1350 or from feedback from the UE 1350. The symbols generated by the transmit processor 1320 are provided to a transmit frame processor 1330 to create a frame structure. The transmit frame processor 1330 creates this frame structure by multiplexing the symbols with information from the controller/processor 1340, resulting in a series of frames. The frames are then provided to a transmitter 1332, which provides various signal conditioning functions including amplifying, filtering, and modulating the frames onto a carrier for downlink transmission over the wireless medium through antenna 1334. The antenna 1334 may include one or more antennas, for example, including beam steering bidirectional adaptive antenna arrays or other similar beam technologies.

At the UE 1350, a receiver 1354 receives the downlink transmission through an antenna 1352 and processes the transmission to recover the information modulated onto the carrier. The information recovered by the receiver 1354 is provided to a receive frame processor 1360, which parses each frame, and provides information from the frames to a channel processor 1394 and the data, control, and reference signals to a receive processor 1370. The receive processor 1370 then performs the inverse of the processing performed by the transmit processor 1320 in the NodeB 1313. More specifically, the receive processor 1370 descrambles and despreads the symbols, and then determines the most likely signal constellation points transmitted by the NodeB 1313 based on the modulation scheme. These soft decisions may be based on channel estimates computed by the channel processor 1394. The soft decisions are then decoded and deinterleaved to recover the data, control, and reference signals. The CRC codes are then checked to determine whether the frames were successfully decoded. The data carried by the successfully decoded frames will then be provided to a data sink 1372, which represents applications running in the UE 1350 and/or various user interfaces (e.g., display). Control signals carried by successfully decoded frames will be provided to a controller/processor 1390. When frames are unsuccessfully decoded by the receiver processor 1370, the controller/processor 1390 may also use an acknowledgement (ACK) and/or negative acknowledgement (NACK) protocol to support retransmission requests for those frames.

In the uplink, data from a data source 1378 and control signals from the controller/processor 1390 are provided to a transmit processor 1380. The data source 1378 may represent applications running in the UE 1350 and various user interfaces (e.g., keyboard). Similar to the functionality described in connection with the downlink transmission by the NodeB 1310, the transmit processor 1380 provides various signal processing functions including CRC codes, coding and interleaving to facilitate FEC, mapping to signal constellations, spreading with OVSFs, and scrambling to produce a series of symbols. Channel estimates, derived by the channel processor 1394 from a reference signal transmitted by the NodeB 1310 or from feedback contained in the midamble transmitted by the NodeB 1310, may be used to select the appropriate coding, modulation, spreading, and/or scrambling schemes. The symbols produced by the transmit processor 1380 will be provided to a transmit frame processor 1382 to create a frame structure. The transmit frame processor 1382 creates this frame structure by multiplexing the symbols with information from the controller/processor 1390, resulting in a series of frames. The frames are then provided to a transmitter 1356, which provides various signal conditioning functions including amplification, filtering, and modulating the frames onto a carrier for uplink transmission over the wireless medium through the antenna 1352.

The uplink transmission is processed at the NodeB 1310 in a manner similar to that described in connection with the receiver function at the UE 1350. A receiver 1335 receives the uplink transmission through the antenna 1334 and processes the transmission to recover the information modulated onto the carrier. The information recovered by the receiver 1335 is provided to a receive frame processor 1336, which parses each frame, and provides information from the frames to the channel processor 1344 and the data, control, and reference signals to a receive processor 1338. The receive processor 1338 performs the inverse of the processing performed by the transmit processor 1380 in the UE 1350. The data and control signals carried by the successfully decoded frames may then be provided to a data sink 1339 and the controller/processor, respectively. If some of the frames were unsuccessfully decoded by the receive processor, the controller/processor 1340 may also use an acknowledgement (ACK) and/or negative acknowledgement (NACK) protocol to support retransmission requests for those frames.

The controller/processors 1340 and 1390 may be used to direct the operation at the NodeB 1310 and the UE 1350, respectively. For example, the controller/processors 1340 and 1390 may provide various functions including timing, peripheral interfaces, voltage regulation, power management, and other control functions. The computer readable media of memories 1342 and 1392 may store data and software for the NodeB 1310 and the UE 1350, respectively. A scheduler/processor 1346 at the NodeB 1310 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for improving re-transmission of reconfiguration messages, comprising:
    detecting that a reconfiguration complete message is transmitted from a user equipment (UE) to a network;
    initiating a reconfiguration re-transmission timer upon the detection;
    determining that the UE has not received a layer two acknowledgement (L2 ACK) message for the transmitted reconfiguration complete message from the network prior to expiration of the reconfiguration re-transmission timer; and
    triggering a cell update message to the network in response to the determination that the UE has not received the L2 ACK message.

2. The method of claim 1, wherein the reconfiguration re-transmission timer is configured based at least on one radio link parameter selected from a list comprising a timer_poll, a max_dat and a round trip time (RTT) of a radio link control (RLC) layer.

3. The method of claim 1, wherein the reconfiguration complete message is transmitted from the UE to the network in response to receiving a reconfiguration message from the network.

4. The method of claim 3, further comprising:
    initiating a radio resource control (RRC) N2 timer upon receiving the reconfiguration message from the network.

5. The method of claim 3, wherein the L2 ACK message is transmitted to the network in response to receiving the reconfiguration message from the network.

6. The method of claim 1, wherein the re-transmission timer is initiated after expiration of a radio resource control (RRC) N2 timer.

7. An apparatus for improving re-transmission of reconfiguration messages, comprising:
means for detecting that a reconfiguration complete message is transmitted from a user equipment (UE) to a network;
means for initiating a reconfiguration re-transmission timer upon the detection;
means for determining that the UE has not received a layer two acknowledgement (L2 ACK) message for the transmitted reconfiguration complete message from the network prior to expiration of the reconfiguration re-transmission timer; and
means for triggering a cell update message to the network in response to the determination that the UE has not received the L2 ACK message.

8. The apparatus of claim 7, wherein the means for initiating the reconfiguration re-transmission timer is further configured based at least on one radio link parameter selected from a list comprising a timer_poll, a max_dat and a round trip time (RTT) of a radio link control (RLC) layer.

9. The apparatus of claim 7, wherein the means for detecting is further configured to transmit the reconfiguration complete message from the UE to the network in response to receiving a reconfiguration message from the network.

10. The apparatus of claim 9, further comprising:
means for initiating a radio resource control (RRC) N2 timer upon receiving the reconfiguration message from the network.

11. The apparatus of claim 9, wherein the means for determining is further configured to transmit the L2 ACK message to the network in response to receiving the reconfiguration message from the network.

12. The apparatus of claim 7, wherein the means for initiating the reconfiguration re-transmission timer is further configured to initiate the re-transmission timer after expiration of a radio resource control (RRC) N2 timer.

13. A non-transitory computer-readable medium storing code executable by a computer for improving re-transmission of reconfiguration messages, comprising:
detecting that a reconfiguration complete message is transmitted from a user equipment (UE) to a network;
initiating a reconfiguration re-transmission timer upon the detection;
determining that the UE has not received a layer two acknowledgement (L2 ACK) message for the transmitted reconfiguration complete message from the network prior to expiration of the reconfiguration re-transmission timer; and
triggering a cell update message to the network in response to the determination that the UE has not received the L2 ACK message.

14. The computer-readable medium of claim 13, wherein the code for initiating the reconfiguration re-transmission timer is configured based at least on one radio link parameter selected from a list comprising a timer_poll, a max_dat and a round trip time (RTT) of a radio link control (RLC) layer.

15. The computer-readable medium of claim 13, wherein the code for detecting is further configured to transmit the reconfiguration complete message from the UE to the network in response to receiving a reconfiguration message from the network.

16. The computer-readable medium of claim 15, further comprising:
code for initiating a radio resource control (RRC) N2 timer upon receiving the reconfiguration message from the network.

17. The computer-readable medium of claim 15, wherein the code for determining is further configured to transmit the L2 ACK message to the network in response to receiving the reconfiguration message from the network.

18. The computer-readable medium of claim 13, wherein the code for initiating the re-transmission timer is further configured to initiate the re-transmission timer after expiration of a radio resource control (RRC) N2 timer.

19. An apparatus for improving re-transmission of reconfiguration messages, comprising:
a reconfiguration message detecting component to detect that a reconfiguration complete message is transmitted from a user equipment (UE) to a network;
a reconfiguration re-transmission timer initiating component to initiate a reconfiguration re-transmission timer upon the detection;
a layer two acknowledgement (L2 ACK) determining component to determine that the UE has not received a layer two acknowledgement (L2 ACK) message for the transmitted reconfiguration complete message from the network prior to expiration of the reconfiguration re-transmission timer; and
a cell update triggering component to trigger a cell update message to the network in response to the determination that the UE has not received the L2 ACK message.

20. The apparatus of claim 19, wherein the reconfiguration re-transmission timer initiating component is further configured based at least on one radio link parameter selected from a list comprising a timer_poll, a max_dat and a round trip time (RTT) of a radio link control (RLC) layer.

21. The apparatus of claim 19, wherein the reconfiguration message detecting component is further configured to transmit the reconfiguration complete message from the UE to the network in response to receiving a reconfiguration message from the network.

22. The apparatus of claim 21, further comprising:
a radio resource control (RRC) N2 timer initiating component is configured to initiate a RRC N2 timer upon receiving the reconfiguration message from the network.

23. The apparatus of claim 21, wherein the L2 ACK determining component is further configured to transmit the L2 ACK message to the network in response to receiving the reconfiguration message from the network.

24. The apparatus of claim 19, wherein the reconfiguration re-transmission timer initiating component is further configured to initiate the re-transmission timer after expiration of a radio resource control (RRC) N2 timer.

* * * * *